Sept. 20, 1966 H. R. EWING 3,273,221
ADJUSTABLE CHIP-BREAKER
Filed Jan. 22, 1965
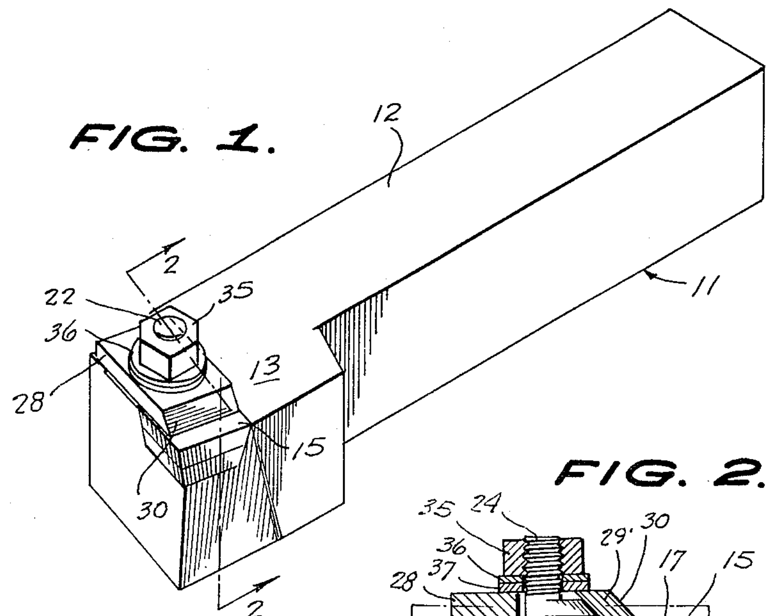
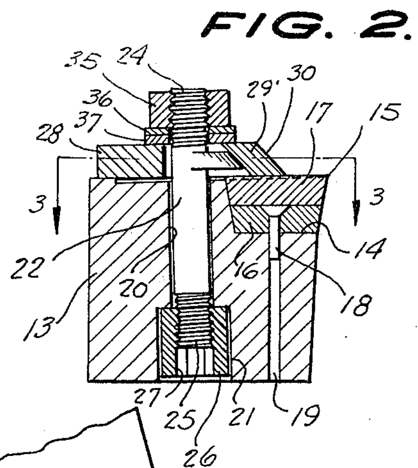
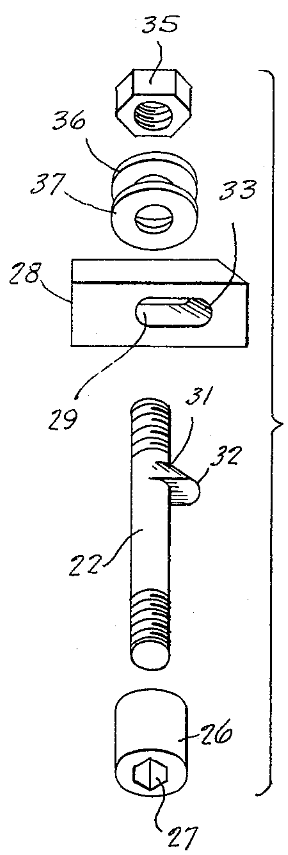
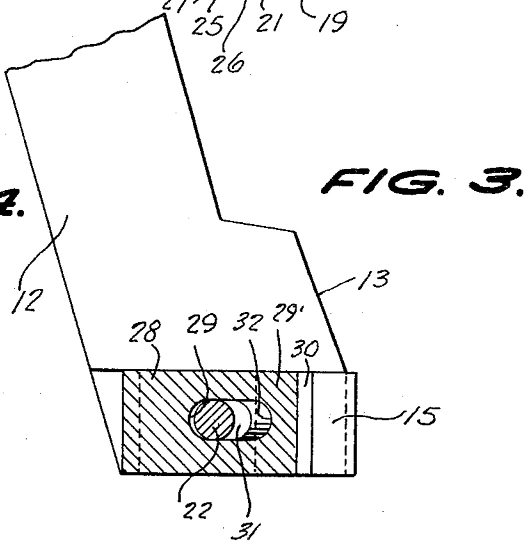
INVENTOR.
HARRY R. EWING,
BY
Berman, Davidson + Berman
ATTORNEYS.

United States Patent Office 3,273,221

Patented Sept. 20, 1966

3,273,221
ADJUSTABLE CHIP-BREAKER

Harry R. Ewing, Rte. 1, Pleasantville, Pa. 16341

Filed Jan. 22, 1965, Ser. No. 427,441
7 Claims. (Cl. 29—96)

This invention relates to cutting tools, and more particularly to chip-breakers employed on lathe tool holders.

In the process of machining and cutting material on a lathe, the cut-away portion leaves the material in the form of a chip which may reach such a size as to be inconvenient and hazardous to the operator and to substantially impair the efficiency of the machining process. This is especially true in cutting metal stock wherein the chips assume a spiral configuration with sharp edges and points and may continue to form so as to reach a great length in the machining process. In order to control the size of the chip, a "chip-breaker" is employed which is located in the path of the chip and which is engaged thereby so as to break it off and to prevent it from becoming too long.

A main object of the present invention is to provide a novel and improved chip-breaker whose position may be easily adjusted without disturbing the setting of the tool holder or the associated cutting tool, whereby the chips can be broken into pieces of predetermined relatively small size, the device being simple in construction, economical to manufacture, and capable of easy and accurate adjustment.

A further object of the invention is to provide an improved chip-breaker for the tool holder of a lathe cutting tool, the chip-breaker being compact in size, serving as a clamping means for the associated tool bit, and being adjustable to an exceptionally high degree of accuracy, providing correspondingly accurate control of the size of chips formed by the associated cutting tool.

A still further object of the invention is to provide an improved accurately adjustable chip-breaker for use on a lathe tool holder to regulate the length of chips formed by the associated cutting tool, the chip-breaker acting as a clamping means for the associated cutting tool bit and being adjustable so that its chip-engaging surface can be accurately placed at a desired location, whereby to obtain chips of optimum length, the chip-breaker being mounted in a manner whereby it may be adjusted without the necessity of resetting the associated tool holder.

Further objects and advantages of the invention will become apparent from the following description and claims, and from the accompanying drawings, wherein:

FIGURE 1 is a perspective view of a lathe tool assembly provided with an improved chip-breaker in accordance with the present invention.

FIGURE 2 is a vertical cross sectional view taken substantially on the line 2—2 of FIGURE 1.

FIGURE 3 is a horizontal cross sectional view taken substantially on the line 3—3 of FIGURE 2.

FIGURE 4 is a perspective view showing the various parts of the chip holder of FIGURES 1 to 3 in separated positions.

Referring to the drawings, 11 designates a lathe tool holder comprising an elongated shank 12 having an enlarged end portion 13, the forward outer top corner of said end portion 13 being formed with a recess 14 adapted to receive a replaceable cutting bit assembly, designated generally at 15. The assembly 15 is of conventional construction and comprises a bottom supporting block 16 and a cutter element 17 secured thereon, the block 16 being provided with a depending positioning pin or stud 18 engageable in a vertical bore or aperture 19 provided in the enlarged end portion 13 of the tool holder, as shown in FIGURE 2, for accurately positioning the assembly 15 in the recess 14, the assembly 15 being furthermore shaped and contoured so as to closely fit in said recess. Thus, when engaged in the recess 14 the cutter assembly 15 is non-rotatably engaged in the recess 14 but must be held in place by the provision of some means to exert downward clamping force thereon.

The enlarged portion 13 of shank 12 is formed with a vertical bore 20 having the enlarged bottom counterbore 21. Designated at 22 is a vertical stud member which is engaged in the bore 20 and which is provided with the respective top and bottom threads 24 and 25. A cylindrical nut member 26 is engaged with the bottom threads 25, being received in the counterbore 21, as shown in FIGURE 2, and being provided with a hexagonal recess 27 adapted to receive an Allen wrench or similar tool for rotating the nut. Designated at 28 is a combined clamping and chip-breaker element comprising a generally rectangular body of hard material, such as hardened metal, formed with a longitudinal slot 29 which receives the upper portion of the shank element 22. The body 28 is provided with a forward end portion 29' which overlies and exerts clamping force on the cutter assembly 15, said end portion having a chip-contacting edge 30. The stud member 22 is provided with a laterally projecting lug 31 at its upper portion which is received in the slot 29, said lug having a generally conical forwardly facing upper camming surface 32 which is cammingly engageable with a correspondingly shaped generally conical front camming surface portion 33 provided at the forward end of the slot 29.

Threadedly engaged on the top threads 24 of stud member 22 is a clamping nut 35. A pair of washers 36 and 37 are engaged on the stud 22 between the nut 35 and the chip-breaker element 28. The lower washer 37 covers the slot 29, and the upper washer 36 transmits clamping force from the nut 35 to the lower washer 37.

As will be readily apparent, vertical adjustment of the stud member 22 provides a corresponding horizontal adjustment of the chip-breaker element 28 by the cooperation between the camming surfaces 32 and 33. Thus, when it is desired to adjust the chip-breaker element 28 by moving it to the right, as viewed in FIGURE 2, the bottom nut 26 is loosened and the top nut 35 is tightened, which causes the stud member 22 to be raised, thereby causing the chip-breaker element 28 to be moved to the right because of the camming cooperation between the surfaces 33 and 32. Similarly, when it is desired to move the chip-breaker element 28 to the left from the position of FIGURE 2, the nut 35 is first loosened, allowing the stud member 22 to descend, and also allowing the chip-breaker element 28 to be manually pushed toward the left, as viewed in FIGURE 2, until its movement is limited by the engagement of surface 33 with surface 32, after which the bottom nut 26 is tightened to lock the member 28 in its adjusted position.

The cooperating camming surfaces 32 and 33 may have any desired angle of inclination to the horizontal. In a preferred embodiment of the invention an angle of 45° was employed.

While a specific embodiment of an improved adjustable chip-breaker assembly for a tool holder has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a tool holder provided with a cutter recess, a cutter disposed in said recess, said tool holder being formed with a vertical aperture adjacent said recess, a stud in said aperture, means to clampingly secure the stud in a vertically adjusted position in said aperture, a chip-breaker mounted on the tool holder and overlying the cutter, said chip-breaker comprising a plate-like main body formed with a longitudinal slot receiving said stud, one end of said slot having an inclined wall surface, and a lug on said stud received in said slot and cammingly engaging said inclined wall surface, whereby the chip-breaker is horizontally adjusted responsive to vertical adjustment of said stud.

2. In combination, a tool holder provided with a cutter recess, a cutter disposed in said recess, said tool holder being formed with a vertical aperture adjacent said recess, a stud in said aperture, a first nut member threaded on the bottom end of said stud and being clampingly engageable with the lower portion of the tool holder, a second nut member threaded on the top end of said stud, a chip-breaker mounted on the tool holder and overlying the cutter, said chip-breaker comprising a plate-like main body formed with a longitudinal slot receiving said stud, one end of said slot having an inclined wall surface, and a lug on said stud received in said slot and cammingly engaging said inclined wall surface, whereby the chip-breaker is horizontally adjusted responsive to vertical adjustment of said stud.

3. In combination, a tool holder provided with a cutter recess, a cutter disposed in said recess, said tool holder being formed with a vertical aperture adjacent said recess, a stud in said aperture, means to clampingly secure the stud in a vertically adjusted position in said aperture, a chip-breaker mounted on the tool holder and overlying the cutter, said chip-breaker comprising a substantially horizontal elongated plate-like main body having a beveled transverse forward edge and being formed with a longitudinal slot receiving said stud, one end of said slot having an inclined wall surface, and a lug on said stud received in said slot and cammingly engaging said inclined wall surface, whereby the chip-breaker is horizontally adjusted responsive to vertical adjustment of said stud.

4. In combination, a tool holder provided with a cutter recess, a cutter disposed in said recess, said tool holder being formed with a vertical aperture adjacent said recess, a stud in said aperture, a first nut member threaded on the bottom end of said stud and being clampingly engageable with the lower portion of the tool holder, a second nut member threaded on the top end of said stud, a chip-breaker mounted on the tool holder and overlying the cutter, said chip-breaker comprising a substantially horizontal elongated plate-like main body having a beveled transverse forward edge and being formed with a longitudinal slot receiving said stud, one end of said slot having an inclined wall surface, and a lug on said stud received in said slot and cammingly engaging said inclined wall surface, whereby the chip-breaker is horizontally adjusted responsive to vertical adjustment of said stud.

5. In combination, a tool holder provided with a cutter recess, a cutter disposed in said recess, said tool holder being formed with a vertical aperture adjacent said recess, a stud in said aperture, means to clampingly secure the stud in a vertically adjusted position in said aperture, a chip-breaker mounted on the tool holder and overlying the cutter, said chip breaker comprising a substantially horizontally elongated plate-like main body having a beveled transverse forward edge and being formed with a longitudinal slot receiving said stud, one end of said slot having an inclined wall surface, and a lug on said stud received in said slot, said lug having an inclined end surface substantially at the same angle of inclination as said inclined wall surface and cammingly engaging said inclined wall surface, whereby the chip-breaker is horizontally adjusted relative to the cutter responsive to vertical adjustment of said stud.

6. In combination, a tool holder provided with a cutter recess, a cutter disposed in said recess, said tool holder being formed with a vertical aperture adjacent said recess, a stud in said aperture, said aperture having a counterbore at its bottom portion, a first nut member threaded on the bottom end of said stud and being clampingly received in said counterbore, a chip-breaker mounted on the tool holder and clampingly overlying the cutter, said chip breaker comprising a plate-like main body formed with a slot receiving said stud, a second nut member threaded on the top end of said stud over said chip-breaker for exerting clamping force thereon, said plate-like main body having a beveled transverse forward edge at the portion thereof overlying the cutter, one end of said slot having an inclined wall surface, and a lug on said stud received in said slot and cammingly engaging said inclined wall surface, whereby the chip-breaker is horizontally adjusted relative to the cutter responsive to vertical adjustment of said stud.

7. In combination, a tool holder provided with a cutter recess, a cutter disposed in said recess, said tool holder being formed with a vertical aperture adjacent said recess, a stud in said aperture, said aperture having a counterbore at its bottom portion, a first nut member threaded on the bottom end of said stud and being clampingly received in said counterbore, a chip-breaker mounted on the tool holder and clampingly overlying the cutter, said chip-breaker comprising a plate-like main body formed with a slot receiving said stud, a second nut member threaded on the top end of said stud over said chip-breaker for exerting clamping force thereon, said plate-like main body having a beveled transverse forward edge at the portion thereof overlying the cutter, one end of said slot having an inclined wall surface, and a lug on said stud received in said slot, said lug having an inclined end surface substantially at the same angle of inclination as said inclined wall surface and cammingly engaging said inclined wall surface, whereby said chip-breaker is horizontally adjusted relative to the cutter responsive to vertical adjustment of said stud.

No references cited.

WILLIAM W. DYER, Jr., *Primary Examiner.*

HARRISON L. HINSON, *Examiner.*